(12) United States Patent
Liu

(10) Patent No.: US 12,369,140 B2
(45) Date of Patent: Jul. 22, 2025

(54) PAGING OPTIMIZATION METHOD AND NETWORK DEVICE

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 352 days.

(21) Appl. No.: 18/072,302

(22) Filed: Nov. 30, 2022

(65) Prior Publication Data

US 2023/0100481 A1     Mar. 30, 2023

Related U.S. Application Data

(63) Continuation of application No. PCT/CN2020/108263, filed on Aug. 10, 2020.

(51) Int. Cl.
*H04W 68/02* (2009.01)

(52) U.S. Cl.
CPC .................... *H04W 68/02* (2013.01)

(58) Field of Classification Search
CPC .................................................... H04W 68/02
USPC ........................................................ 455/458
See application file for complete search history.

(56) References Cited

U.S. PATENT DOCUMENTS

2017/0374644 A1    12/2017    Ryu et al.
2018/0192436 A1*    7/2018    Yi ..................... H04W 72/23
2019/0182716 A1*    6/2019    Futaki ............... H04W 36/0064
2020/0100319 A1*    3/2020    Talebi Fard ......... H04W 76/32
2021/0018630 A1*    1/2021    Mueller .................. H04L 67/56

FOREIGN PATENT DOCUMENTS

| CN | 106304336 A | 1/2017 |
|---|---|---|
| CN | 107431998 A | 12/2017 |
| CN | 108401290 A | 8/2018 |
| EP | 3169122 A1 | 5/2017 |
| EP | 3267744 A1 | 1/2018 |
| WO | 2017107073 A1 | 6/2017 |
| WO | 2018137459 A1 | 8/2018 |

OTHER PUBLICATIONS

International Search Report with English Translation for PCT/CN2020/108263 mailed Apr. 27, 2021.
3GPP TSG RAN WG3 #88 R3-151101; Fukuoka, Japan, May 25-29, 2015.
3GPP TSG-RAN WG2 Meeting #108; Reno, USA, Nov. 18-22, 2019; R2-1916351.
Alcatel-Lucent, Alcatel-Lucent Shanghai Bell, Paging Optimization, 3GPP TSG-RAN3 Meeting #89, R3-151567, Aug. 24-28, 2015. (7 pages).
Extended European Search Report for EP Application 20948952.5 mailed Jun. 6, 2023. (13 pages).

* cited by examiner

*Primary Examiner* — Joel Ajayi
(74) *Attorney, Agent, or Firm* — Young Basile Hanlon & MacFarlane, P.C.

(57) ABSTRACT

Embodiments relate to a paging optimization method and a network device. The method comprises: receiving a paging message sent by a core network device, the paging message carrying current paging cell information and/or information for determining the current paging cell; and performing paging according to the paging message. Paging optimization can be achieved, and paging failure caused by the change of the current cell is avoided.

3 Claims, 8 Drawing Sheets

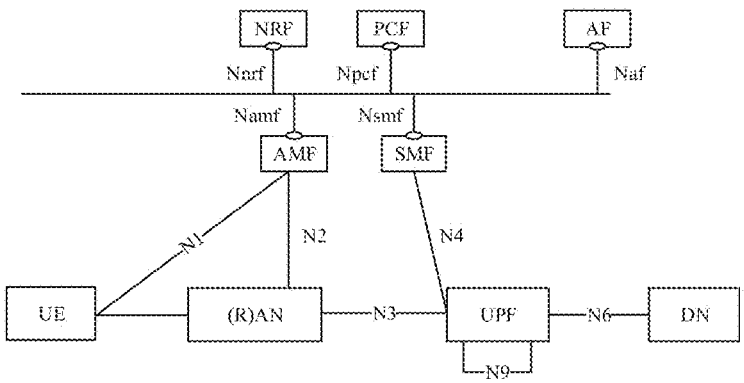
FIG. 1
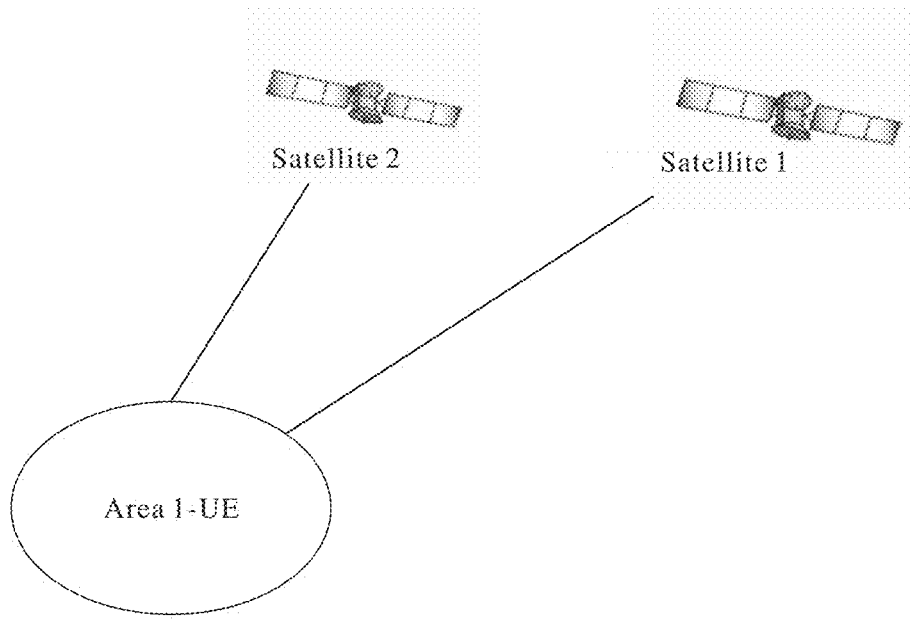
FIG. 2
FIG. 3

Send a paging message to an access network device, information of a current paging cell and/or information for determining a current paging cell being carried in the paging message — S910

PAGING OPTIMIZATION METHOD AND NETWORK DEVICE

CROSS-REFERENCE TO RELATED APPLICATION(S)

The present application is a continuation application of International PCT Application No. PCT/CN2020/108263, filed on Aug. 10, 2020, the entire content of which is hereby incorporated by reference.

TECHNICAL FIELD

The present application relates to the field of communications, and more specifically, relates to a paging optimization method and a network device.

BACKGROUND

In 5th Generation Mobile Networks (5G), when a User Equipment (UE) is in an idle state, if there is downlink data or downlink signaling to be sent to the UE on a network side, it is needed to page the UE. When an Access and Mobility Management Function (AMF) triggers paging, a Radio Access Network (RAN) is generally requested to perform paging in an entire registration area. In order to achieve paging optimization, the RAN may carry a paging recommendation cell when sending a UE context release request, so that the AMF carries the paging recommendation cell in a paging message, and the RAN may only perform paging within the paging recommendation cell. Thereby, a purpose of paging optimization is achieved by performing paging within a smaller area.

In a scenario of a non-Terrestrial Network (NTN), since an asynchronous satellite moves relative to the ground, a cell of a satellite providing services for the UE will change at different times, although the UE does not move. In this case, if the AMF carries the paging recommendation cell in the paging message and the RAN only performs paging within the paging recommendation cell still according to an existing paging optimization method, it will lead to failure of the paging.

SUMMARY

A paging optimization method and a terminal device of embodiments of the present application may achieve paging optimization and avoid a paging failure caused by a change of a current cell in some scenarios (for example, in an NTN scenario).

An embodiment of the present application provides a paging optimization method, which is applied to an access network device and includes: receiving a paging message sent by a core network device; information of a current paging cell and/or information for determining a current paging cell being carried in the paging message; and performing paging according to the paging message.

An embodiment of the present application also provides a paging optimization method, which is applied to a core network device and includes: sending a paging message to an access network device, wherein information of a current paging cell and/or information for determining a current paging cell is carried in the paging message.

An embodiment of the present application provides a network device, which includes: a paging message reception module, configured to receive a paging message sent by a core network device; information of a current paging cell and/or information for determining a current paging cell is carried in the paging message; and a paging module, configured to perform paging according to the paging message.

An embodiment of the present application provides a network device, which includes: a paging message sending module, configured to send a paging message to an access network device, wherein information of a current paging cell and/or information for determining a current paging cell is carried in the paging message.

An embodiment of the present application provides a network device, which includes: a processor and a memory, wherein the memory is configured to store a computer program, and the processor is configured to invoke and run the computer program stored in the memory to perform the method as described in any one of the above.

An embodiment of the present application provides a chip, which includes: a processor, configured to invoke and run a computer program from a memory, to enable a device in which the chip is installed to perform the method as described in any one of the above.

An embodiment of the present application provides a computer-readable storage medium, configured to store a computer program, wherein the computer program enables a computer to perform the method as described in any one of the above.

An embodiment of the present application provides a computer program product, which includes computer program instructions, wherein the computer program instructions enable a computer to perform the method as described in any one of the above.

An embodiment of the present application provides a computer program, wherein the computer program enables a computer to perform the method as described in any one of the above.

According to the embodiment of the present application, by carrying information of a current paging cell and/or information for determining a current paging cell in a paging message sent by a core network, paging can be performed according to the carried information, thereby achieving paging optimization and avoiding a paging failure caused by a change of a current cell.

BRIEF DESCRIPTION OF DRAWINGS

FIG. 1 is a schematic diagram of an application scenario according to an embodiment of the present application.

FIG. 2 is a schematic diagram of an implementation of a moving cell in an asynchronous satellite network.

FIG. 3 is a flow chart of an implementation of a paging optimization method 300 according to an embodiment of the present application.

DETAILED DESCRIPTION

Figure 4:
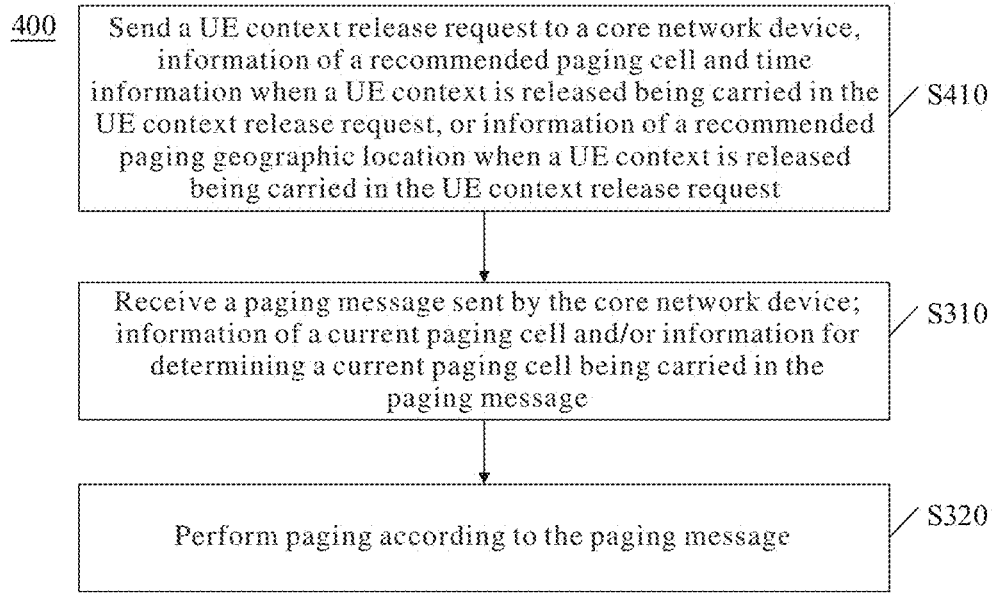
FIG. 4 is a flow chart of an implementation of a paging optimization method 400 according to an embodiment of the present application.

Technical solutions in the embodiments of the present application will be described below in combination with accompanying drawings in the embodiments of the present application.

The technical solutions of the embodiments of the present application may be applied to various communication systems, e.g., a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio (NR) system, an evolution system of an NR system, an LTE-based access to unlicensed spectrum (LTE-U) system, an NR-based access to unlicensed spectrum (NR-U) system, a Universal Mobile Telecommunication System (UMTS), Wireless Local Area Networks (WLAN), Wireless Fidelity (WiFi), a next generation communication (5th-Generation (5G)) system, or another communication system.

Generally speaking, traditional communication systems support a limited quantity of connections, and are easy to implement. However, with development of communication technologies, a mobile communication system will not only support traditional communication, but also support, for example, Device to Device (D2D) communication, Machine to Machine (M2M) communication, Machine Type Communication (MTC), and Vehicle to Vehicle (V2V) communication, and the embodiments of the present application may also be applied to these communication systems.

In an exemplary implementation, a communication system in the embodiments of the present application may be applied to a Carrier Aggregation (CA) scenario, or a Dual Connectivity (DC) scenario, or a Standalone (SA) network deployment scenario.

The applied frequency spectrums are not limited in the embodiments of the present application. For example, a licensed spectrum, or an unlicensed spectrum may be applied in an embodiment of the present application.

Various embodiments of the present application are described in combination with the network device and the terminal device. The terminal device may also be referred to as a User Equipment (UE), an access terminal, a subscriber unit, a subscriber station, a mobile station, a mobile platform, a remote station, a remote terminal, a mobile device, a user terminal, a terminal, a wireless communication device, a user agent, or a user apparatus, etc. The terminal device may be a STATION (ST) in the WLAN, or may be a cellular phone, a cordless phone, a Session Initiation Protocol (SIP) phone, a Wireless Local Loop (WLL) station, a Personal Digital Assistant (PDA) device, a handheld device with a wireless communication function, a computing device, or another processing device connected to a wireless modem, a vehicle-mounted device, a wearable device, or a terminal device in a next generation communication system, e.g., a terminal device in an NR network, or a terminal device in a future evolved Public Land Mobile Network (PLMN).

As an example rather than limitation, in the embodiments of the present application, the terminal device may be a wearable device. The wearable device may also be referred to as a wearable smart device, which is a general term of wearable devices developed by intelligent design on daily wear by applying wearable technology, such as glasses, gloves, a watch, clothing and shoes. The wearable device is a portable device that is worn directly on a body, or integrated into clothes or accessories of users. The wearable device not only is a hardware device, but also implements powerful functions through software support as well as data interaction or cloud interaction. Generalized wearable smart devices include devices which are fully functional, have large sizes, and may implement complete or partial functions without relying on smart phones, such as a smart watch or smart glasses, and devices which focus on a certain kind of application functions only and need to be used in conjunction with other devices such as smart phones, such as various smart bracelets, smart jewelries or the like for monitoring physical signs.

The network device may be a device configured to communicate with a mobile device. The network device may be an Access Point (AP) in WLAN, or a Base Transceiver Station (BTS) in GSM or CDMA, or may be a NodeB (NB) in WCDMA, or an Evolutional Node B (eNB or eNodeB) in LTE, or a relay station or an access point, or a vehicle-mounted device, a wearable device, a network device (gNB) in an NR network, or a network device in a future evolved PLMN network, etc.

In an embodiment of the present application, a network device provides a service for a cell, and a terminal device communicates with the network device through a transmission resource (e.g., a frequency domain resource, or referred to as a spectrum resource) used for the cell, wherein the cell may be a cell corresponding to the network device (e.g., a base station). The cell may belong to a macro base station, or a base station corresponding to a Small cell. The Small cell here may include: a Metro cell, a Micro cell, a Pico cell, or a Femto cell, etc. These Small cells have characteristics of a small coverage range and a low transmission power, and are suitable for providing high-speed data transmission services.

FIG. 1 exemplarily illustrates a system architecture diagram for a mobile terminal to access a mobile network. Herein, the mobile terminal is connected with a base station in an Access Stratum (AS), and interacts an access stratum message and a wireless data transmission with the base station; and a UE is connected with a mobility management function in a Non-Access Stratum (NAS), and interacts an NAS message with the mobility management function. An Access and Mobility Management Function (AMF) is responsible for a management of mobility of the UE, and a session management function is responsible for a session management of the UE. The access and mobility management function is also responsible for forwarding a message related to the session management between the mobile terminal and the session management function in addition to performing a mobility management of the mobile terminal. A policy control function is responsible for formulating policies related to the mobility management, the session management, billing, etc of the UE. A user plane function is connected with the base station and an external data network for data transmission.

In an exemplary implementation, the wireless communication system 100 may also include a Mobility Management Entity (MME), and other network entities, which are not limited by embodiments of the present application.

It should be understood that the terms "system" and "network" are often used interchangeably herein. The term "and/or" herein refers to an association relationship describing associated objects only, which indicates that there may be three kinds of relationships, for example, A and/or B may indicate three cases: A alone, both A and B, and B alone. In addition, the symbol "/" herein generally indicates that objects before and after the symbol "/" have an "or" relationship.

FIG. 2 is a schematic diagram of an implementation of a moving cell in an asynchronous satellite network. As shown in FIG. 2, in an asynchronous satellite network, due to mobility of satellites, cell 1 of satellite 1 provides services for a UE in an area 1 at time T, Cell 2 of satellite 2 provides services for the UE in the area 1 at time T+t if the UE is in a stationary state relative to the ground. However, Tracking Area Codes (TACs) broadcast by the two satellites in the area 1 are the same.

In the FIG. 2 above, for the UE in the area 1, when paging is implemented, if the paging still depends on a recommended cell in a UE context release request sent by RAN, it may be caused that the UE has moved out of this satellite serving cell (although the UE in the area 1 is stationary relative to the ground, a cell identity (cell ID) providing services for the area 1 is changing due to moving of the satellites), thereby leading to a paging failure. If the paging is performed within the recommended cell, the AMF needs to page the UE in a larger area, such as within a registration area, which instead causes waste of signaling messages.

An embodiment of the present application provides a paging optimization method, which may be applied to a RAN node. FIG. 3 is a flow chart of an implementation of a paging optimization method 300 according to an embodiment of the present application, and the method may in an exemplary implementation be applied to but is not limited to the system shown in FIG. 1. The method includes at least portion of following contents S310 and S320.

In S310, a paging message sent by a core network device is received; wherein information of a current paging cell and/or information for determining a current paging cell is carried in the paging message.

In S320, paging is performed according to the paging message.

In an exemplary implementation, when the information of the current paging cell is carried in the above paging message, the above act S320 may include: paging is performed within the current paging cell according to the information of the current paging cell.

The above information of the paging cell may include an identity (ID) of the paging cell.

In an exemplary implementation, when the information for determining the current paging cell is carried in the above paging message, the above act S320 may include: the current paging cell is determined according to the information for determining the current paging cell, and paging is performed within the current paging cell.

Specifically, in an embodiment, the above information for determining the current paging cell includes information of a recommended paging cell and time information when a UE context is released. Accordingly, the above act S320 includes: the current paging cell is determined according to the information of the recommended paging cell and the time information when the UE context is released; and paging is performed within the current paging cell.

The above time information may include a time stamp.

When the current paging cell is determined, the current paging cell may be determined according to at least one of the information of the recommended paging cell and the time information when the UE context is released, a satellite velocity, a satellite orbit height, and current time. For example, the current paging cell is determined according to the information of the recommended paging cell and the time information when the UE context is released, the satellite velocity, and the current time; or, the current paging cell is determined according to the information of the recommended paging cell and the time information when the UE context is released, the satellite orbit height, and the current time.

In another embodiment, the information for determining the current paging cell includes information of a recommended paging geographic location when the UE context is released. Accordingly, the above act S320 includes: the current paging cell is determined according to the information of the recommended paging geographic location when the UE context is released; and paging is performed within the current paging cell.

Herein, the determined current paging cell may be a cell corresponding to a satellite covering the recommended paging geographic location.

As shown in FIG. 4, before the above act S310, an act S410 may further be included.

In S410, a UE context release request is sent to the core network device, wherein the information of the recommended paging cell and the time information when the UE context is released are carried in the UE context release request, or the information of the recommended paging geographic location when the UE context is released is carried in the UE context release request.

In an embodiment of the present application, the above core network device may include an AMF.

The present application will be described in detail below with reference to the accompanying drawings through specific embodiments.

First Embodiment

Figure 5:
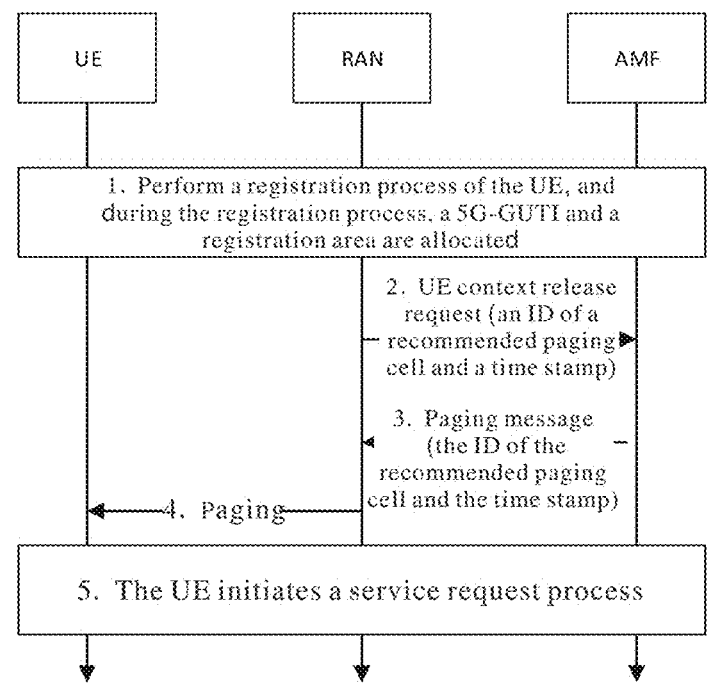
FIG. 5 is a flow chart of an implementation according to a first embodiment of the present application.

FIG. 5 is a flow chart of an implementation according to the first embodiment of the present application. In the present embodiment, the core network device is the AMF. As shown in FIG. 5, the present embodiment includes the following acts 1 to 5.

In act 1, a UE initiates a registration process. During the registration process, the AMF allocates a 5G Globally Unique Temporary UE Identity (5G-GUTI) and a registration area to the UE.

In act 2, a RAN detects that the UE has no data to send or receive within certain time, and the RAN requests to release the UE context, such as sends a UE context release request to the AMF; and in this way, a state of the UE becomes an idle state. When the RAN uses a satellite network and uses a moving cell broadcast mode for the ground, the RAN carries the information of the recommended paging cell (such as an ID of the recommended paging cell) and a time stamp in the UE context release request.

In act 3, when a network side has downlink data or downlink signaling to be sent to the UE, the AMF requests the RAN to page the UE, for example, the AMF sends a paging message to a RAN node. In order to achieve paging optimization, the AMF carries the information of the recommended paging cell (such as the ID of the recommended paging cell) and the time stamp in the paging message. At the same time, the AMF may start a paging wait timer.

In act 4, the RAN maps a current suitable paging cell (or referred to as the current paging cell) according to the ID of the recommended paging cell and the time stamp, and performs paging within the current suitable paging cell.

A specific mapping mode may be that: the RAN determines the current suitable paging cell according to at least one of the information of the recommended paging cell (such as the ID) and the time information when the UE context is released, the satellite velocity, the satellite orbit height, and the current time.

In act 5, the UE receives the paging message, and initiates a service request process. When the AMF receives a service request message initiated by the UE, the AMF stops running the above paging wait timer. If the AMF still does not receive the service request message initiated by the UE when the paging wait timer expires, the AMF may re-send a paging message to the RAN node.

Second Embodiment

Figure 6:
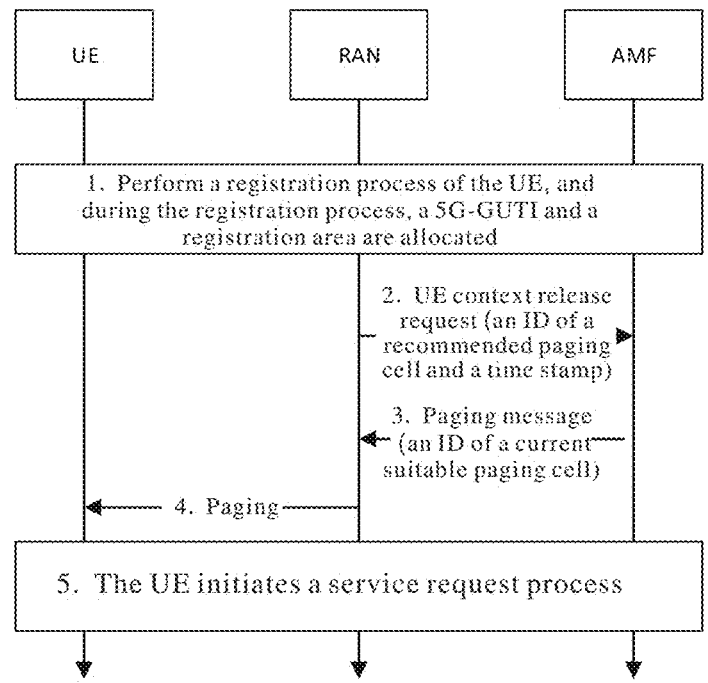
FIG. 6 is a flow chart of an implementation according to a second embodiment of the present application.

FIG. 6 is a flow chart of an implementation according to the second embodiment of the present application. In the present embodiment, the core network device is the AMF. As shown in FIG. 6, the present embodiment includes the following acts 1 to 5.

In act 1, a UE initiates a registration process, and during the registration process, the AMF allocates a 5G-GUTI and a registration area to the UE.

In act 2, a RAN detects that the UE has no data to send or receive within certain time, and the RAN requests to release the UE context, such as sends a UE context release request to the AMF; and in this way, a state of the UE becomes an idle state. When the RAN uses a satellite network and uses a moving cell broadcast mode for the ground, the RAN carries the information of the recommended paging cell (such as an ID of the recommended paging cell) and a time stamp in the UE context release request.

In act 3, when a network side has downlink data or downlink signaling to be sent to the UE, the AMF requests the RAN to page the UE, for example, the AMF sends a paging message to a RAN node. In order to achieve paging optimization, the AMF may map a current suitable paging cell according to the ID of the recommended paging cell and the time stamp, and carry information of the current suitable paging cell (such as an ID) in the paging message. At the same time, the AMF may start a paging wait timer.

A specific mapping mode may be that: the AMF determines the current suitable paging cell according to at least one of the information of the recommended paging cell (such as the ID) and the time information when the UE context is released, the satellite velocity, the satellite orbit height, and the current time.

In act 4, the RAN performs paging in the current suitable paging cell according to the information of the current suitable paging cell (such as the ID).

In act 5, the UE receives the paging message, and initiates a service request process. When the AMF receives a service request message initiated by the UE, the AMF stops running the above paging wait timer. If the AMF still does not receive the service request message initiated by the UE when the paging wait timer expires, the AMF may re-send the paging message to the RAN node.

Third Embodiment

Figure 7:
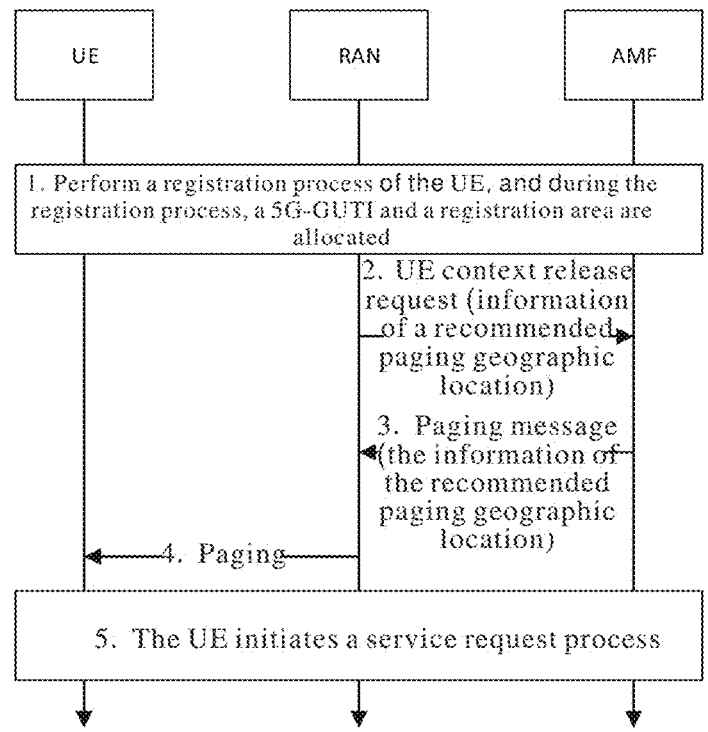
FIG. 7 is a flow chart of an implementation according to a third embodiment of the present application.

FIG. 7 is a flow chart of an implementation according to the third embodiment of the present application. In the present embodiment, the core network device is the AMF. As shown in FIG. 7, the present embodiment includes the following acts 1 to 5.

In act 1, a UE initiates a registration process, and during the registration process, the AMF allocates a 5G-GUTI and a registration area to the UE.

In act 2, a RAN detects that the UE has no data to send or receive within certain time, and the RAN requests to release the UE context, such as sends a UE context release request to the AMF; and in this way, a state of the UE becomes an idle state. When the RAN uses a satellite network and uses a moving cell broadcast mode for the ground, the RAN carries the information of the recommended paging geographic location in the UE context release request.

In act 3, when a network side has downlink data or downlink signaling to be sent to the UE, the AMF requests the RAN to page the UE, for example, the AMF sends a paging message to a RAN node. In order to achieve paging optimization, the AMF carries the information of the recommended paging geographic location in the paging message. At the same time, the AMF may start a paging wait timer.

In act 4, the RAN maps a current suitable paging cell according to the information of the recommended paging geographic location, and performs paging in the current suitable paging cell.

A specific mapping mode may be that: the RAN determines the current paging cell according to the information of the recommended paging geographic location, wherein the current paging cell may be a cell corresponding to a satellite covering the recommended paging geographic location.

In act 5, the UE receives the paging message, and initiates a service request process. When the AMF receives a service request message initiated by the UE, the AMF stops running the above paging wait timer. If the AMF still does not receive the service request message initiated by the UE when the paging wait timer expires, the AMF may re-send the paging message to the RAN node.

Fourth Embodiment

Figures 8, 9:
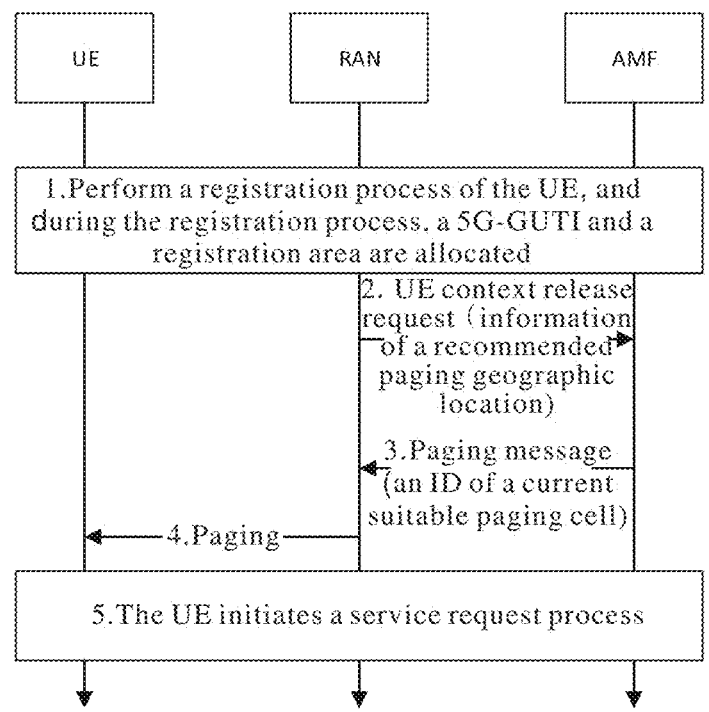
FIG. 8 is a flow chart of an implementation according to a fourth embodiment of the present application.
FIG. 9 is a flow chart of an implementation of a paging optimization method 900 according to an embodiment of the present application.

FIG. 8 is a flow chart of an implementation according to the fourth embodiment of the present application. In the present embodiment, the core network device is the AMF. As shown in FIG. 8, the present embodiment includes the following acts 1 to 5.

In act 1, a UE initiates a registration process, and during the registration process, the AMF allocates a 5G-GUTI and a registration area to the UE.

In act 2, a RAN detects that the UE has no data to send or receive within certain time, and the RAN requests to release the UE context, such as sends a UE context release request to the AMF; and in this way, a state of the UE becomes an idle state. When the RAN uses a satellite network and uses a moving cell broadcast mode for the ground, the RAN carries the information of the recommended paging geographic location in the UE context release request.

In act 3, when a network side has downlink data or downlink signaling to be sent to the UE, the AMF requests the RAN to page the UE, for example, the AMF sends a paging message to a RAN node. In order to achieve paging optimization, the AMF may map a current suitable paging cell according to the information of the recommended paging geographic location, and carry information of the current suitable paging cell (such as an ID) in the paging message. At the same time, the AMF may start a paging wait timer.

A specific mapping mode may be that: the AMF determines the current paging cell according to the information of the recommended paging geographic location, wherein the current paging cell may be a cell corresponding to a satellite covering the recommended paging geographic location.

In act 4, the RAN performs paging in the current suitable paging cell according to the information of the current suitable paging cell (such as the ID).

In act 5, the UE receives the paging message, and initiates a service request process. When the AMF receives a service request message initiated by the UE, the AMF stops running the above paging wait timer. If the AMF still does not receive the service request message initiated by the UE when the paging wait timer expires, the AMF may re-send the paging message to the RAN node.

It can be seen from the above embodiments that, in the embodiment of the present application, the current suitable paging cell can be determined according to information related to the recommended paging cell when the UE context is released; and paging can be initiated within the current suitable paging cell, thus achieving paging optimization of a mobile satellite network and solving a signaling waste problem caused by paging optimization in the mobile satellite network.

An embodiment of the present application also provides a paging optimization method, which may be applied to the above core network device, such as an AMF. FIG. 9 is a flow chart of an implementation of a paging optimization method 900 according to an embodiment of the present application, including an act S910.

In S910, a paging message is sent to an access network device, wherein information of a current paging cell and/or information for determining a current paging cell is carried in the paging message.

In an exemplary implementation, the above information for determining the current paging cell includes information of a recommended paging cell and time information when a UE context is released, or includes information of a recommended paging geographic location when a UE context is released.

Figure 10:
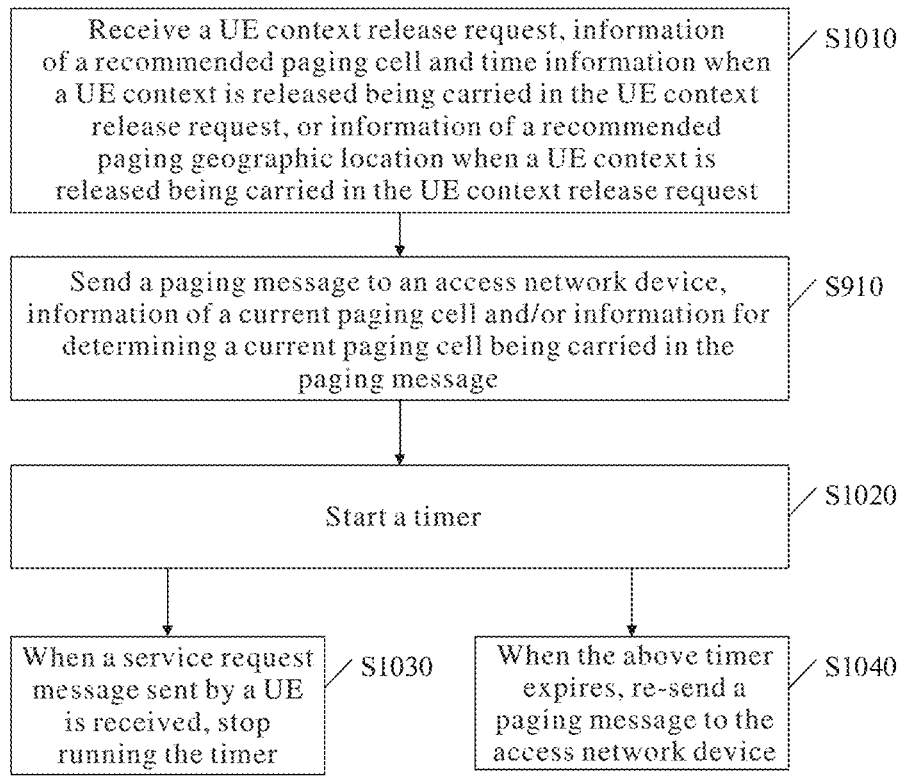
FIG. 10 is a flow chart of an implementation of a paging optimization method 1000 according to an embodiment of the present application.

As shown in FIG. 10, before the above act S910, an act S1010 may further be included.

In S1010, a UE context release request is received, wherein the information of the recommended paging cell and the time information when the UE context is released are carried in the UE context release request, or the information of the recommended paging geographic location when the UE context is released is carried in the UE context release request.

Correspondingly, the above act S910 may include: a paging message is sent to the access network device, wherein the information of the recommended paging cell and the time information when the UE context is released carried in the UE context release request are carried in the paging message, or the information of the recommended paging geographic location when the UE context is released carried in the UE context release request is carried in the paging message.

Or, the above act S910 may include: the current paging cell is determined according to the information of the recommended paging cell and the time information when the UE context is released; or, the current paging cell is determined according to the information of the recommended paging geographic location when the UE context is released; and the paging message carrying the information of the current paging cell is sent to the access network device.

In an embodiment, the current paging cell may be determined according to at least one of the information of the recommended paging cell and the time information when the UE context is released, a satellite velocity, a satellite orbit height, and current time. For example, the current paging cell is determined according to the information of the recommended paging cell and the time information when the UE context is released, the satellite velocity, and the current time; or, the current paging cell is determined according to the information of the recommended paging cell and the time information when the UE context is released, the satellite orbit height, and the current time.

Or, in another embodiment, the current paging cell may be determined according to the information of the recommended paging geographic location when the UE context is released, wherein, the current paging cell is a cell corresponding to a satellite covering the recommended paging geographic location.

In an exemplary implementation, as shown in FIG. 10, the above method may further include acts S1020 to S1040.

In S1020, a timer is started.

In S1030, when a service request message sent by a UE is received, the timer is stopped.

Or, as shown in FIG. 10, the above method may further include an act S1040.

In S1040, when the above timer expires, the paging message is re-sent to the access network device.

Figure 11:
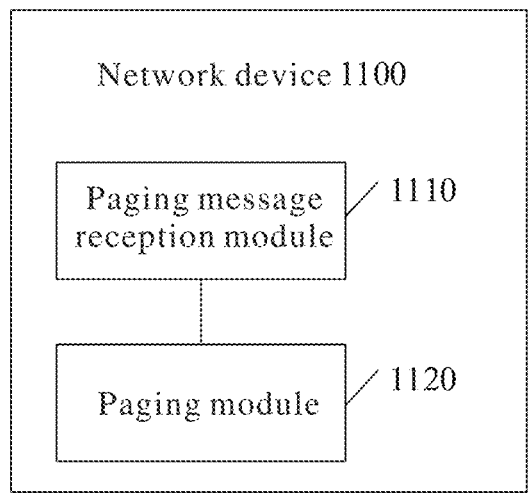
FIG. 11 is a schematic diagram of a structure of a network device 1100 according to an embodiment of the present application.

An embodiment of the present application also provides a network device, wherein the network device may be the above RAN node. FIG. 11 is a schematic diagram of a structure of a network device 1100 according to an embodiment of the present application, including a paging message reception module 1110 and a paging module 1120.

The paging message reception module 1110 is configured to receive a paging message sent by a core network device; wherein information of a current paging cell and/or information for determining a current paging cell is carried in the paging message.

The paging module 1120 is configured to perform paging according to the paging message.

In an exemplary implementation, the above paging module 1120 is configured to perform paging within the current paging cell according to the information of the current paging cell.

In an exemplary implementation, the above information for determining the current paging cell includes information of a recommended paging cell and time information when a UE context is released.

Figure 12:
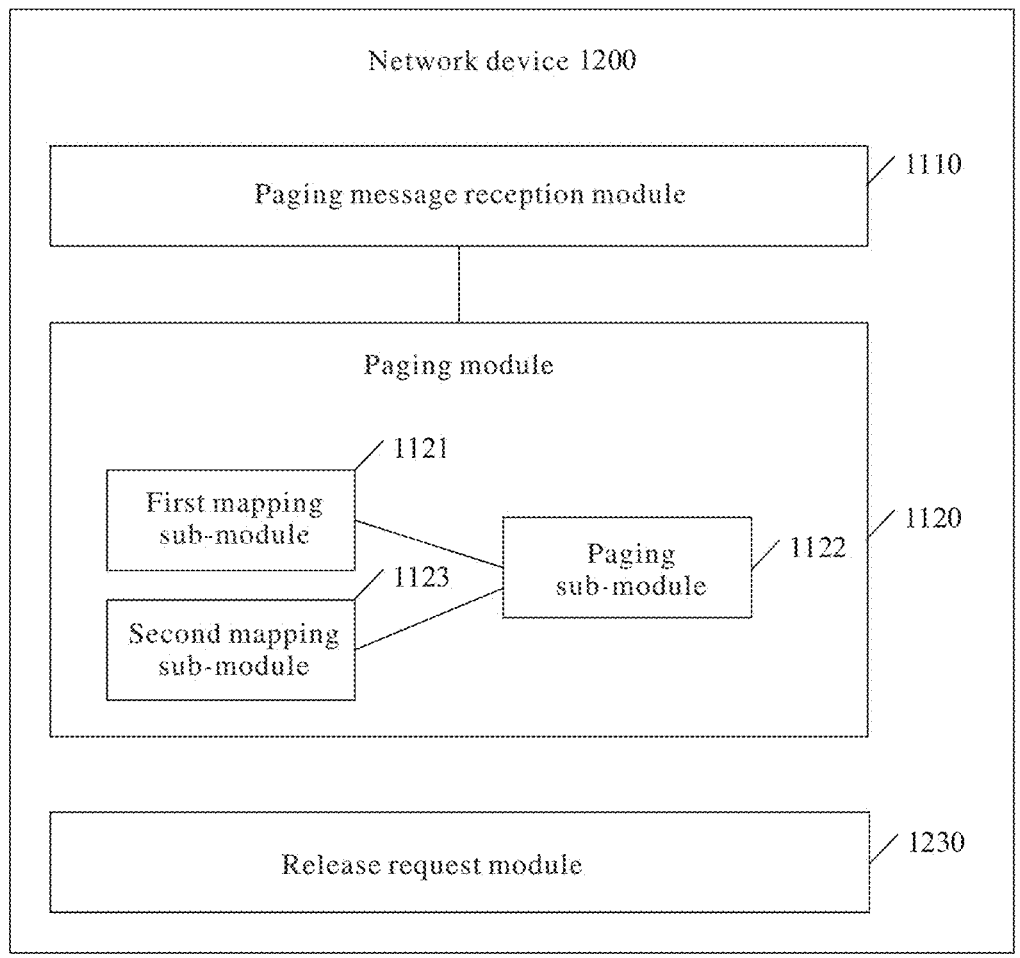
FIG. 12 is a schematic diagram of a structure of a network device 1200 according to an embodiment of the present application.

In an exemplary implementation, as shown in FIG. 12, the above paging module 1120 includes a first mapping sub-module 1121 and a paging sub-module 1122.

The first mapping sub-module 1121 is configured to determine the current paging cell according to the information of the recommended paging cell and the time information when the UE context is released.

The paging sub-module 1122 is configured to perform paging within the current paging cell.

In an exemplary implementation, the above first mapping sub-module 1121 is configured to determine the current paging cell according to at least one of the information of the recommended paging cell and the time information when the UE context is released, a satellite velocity, a satellite orbit height, and current time. For example, the above first mapping sub-module 1121 is configured to determine the current paging cell according to the information of the recommended paging cell and the time information when the UE context is released, the satellite velocity, and the current time; or, according to the information of the recommended paging cell and the time information when the UE context is released, the satellite orbit height, and the current time.

In an exemplary implementation, the above information for determining the current paging cell includes the information of the recommended paging geographic location when the UE context is released.

In an exemplary implementation, the above paging module 1120 includes a second mapping sub-module 1123 and a paging sub-module 1122.

The second mapping sub-module 1123 is configured to determine the current paging cell according to the information of the recommended paging geographic location when the UE context is released.

The paging sub-module 1122 is configured to perform paging within the current paging cell.

In an exemplary implementation, the above second mapping sub-module 1123 is configured to determine the current paging cell according to the information of the recommended paging geographic location when the UE context is released; wherein the current paging cell is a cell corresponding to a satellite covering the recommended paging geographical location.

In an exemplary implementation, as shown in FIG. 12, the above network device may further include a release request module 1230 configured to send a UE context release request to the core network device, wherein the information of the recommended paging cell and the time information when the UE context is released are carried in the UE context release request, or the information of the recommended paging geographic location when the UE context is released is carried in the UE context release request.

In an exemplary implementation, the above core network device includes an Access and Mobility Management Function (AMF).

It should be understood that the above and other operations and/or functions of modules in the network device according to the embodiment of the present application are respectively for implementing corresponding flows of the network device in the method 300 in FIG. 3 and the method 400 in FIG. 4, which will not be repeated here for brevity.

Figure 13:
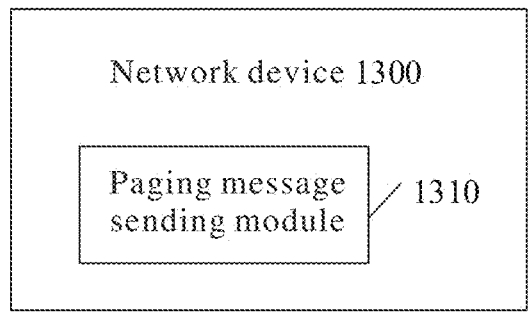
FIG. 13 is a schematic diagram of a structure of a network device 1300 according to an embodiment of the present application.

An embodiment of the present application also provides a network device, wherein the network device may be the above AMF. FIG. 13 is a schematic diagram of a structure of a network device 1300 according to an embodiment of the present application, including a paging message sending module 1310.

The paging message sending module 1310 is configured to send a paging message to an access network device, wherein information of a current paging cell and/or information for determining a current paging cell is carried in the paging message.

In an exemplary implementation, the above information for determining the current paging cell includes information of a recommended paging cell and time information when a UE context is released, or includes information of a recommended paging geographic location when a UE context is released.

Figure 14:
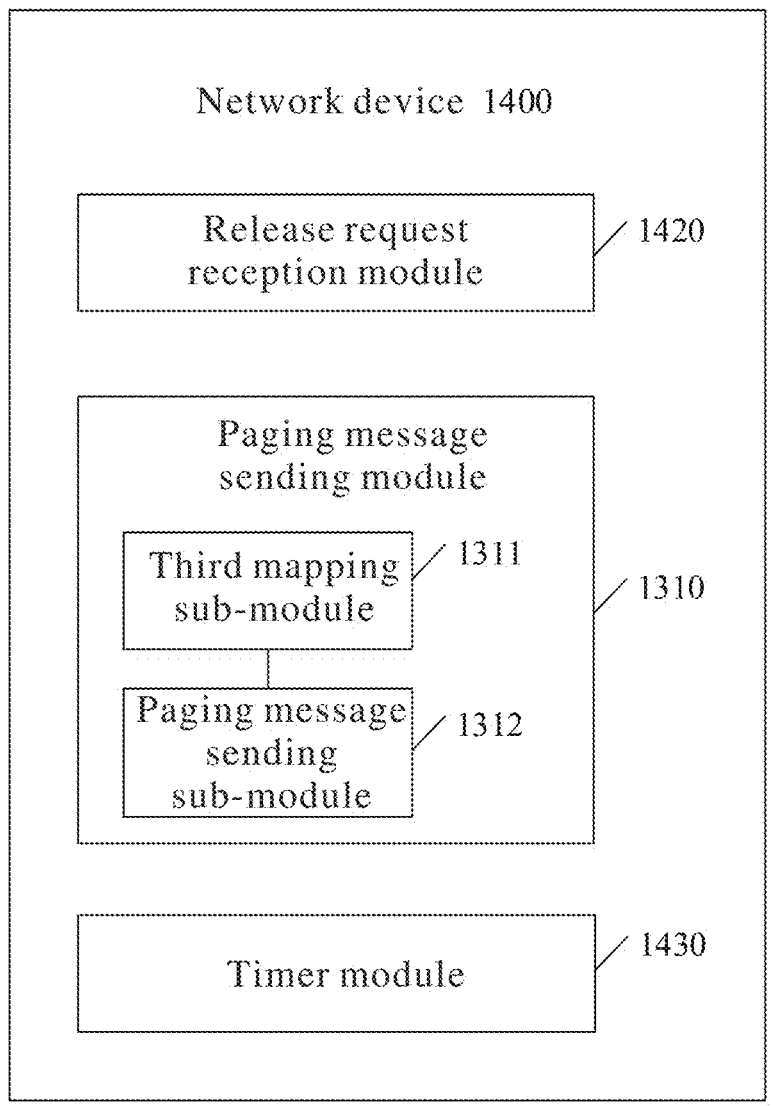
FIG. 14 is a schematic diagram of a structure of a network device 1400 according to an embodiment of the present application.

In an exemplary implementation, as shown in FIG. 14, the above network device may further include a release request reception module 1420 configured to receive a UE context release request, wherein the information of the recommended paging cell and the time information when the UE context is released are carried in the UE context release request, or the information of the recommended paging geographic location when the UE context is released is carried in the UE context release request.

In an exemplary implementation, the above paging message sending module 1310 includes a third mapping sub-module 1311 and a paging message sending sub-module 1312.

The third mapping sub-module 1311 is configured to determine the current paging cell according to the information of the recommended paging cell and the time information when the UE context is released; or, determine the current paging cell according to the information of the recommended paging geographic location when the UE context is released.

The paging message sending sub-module 1312 is configured to send the paging message carrying the information of the current paging cell to the access network device.

In an exemplary implementation, the above third mapping sub-module 1311 determines the current paging cell according to at least one of the information of the recommended paging cell and the time information when the UE context is released, a satellite velocity, a satellite orbit height, and current time. For example, the above third mapping sub-module 1311 determines the current paging cell according to the information of the recommended paging cell and the time information when the UE context is released, the satellite velocity, and the current time; or, determines the current paging cell according to the information of the recommended paging cell and the time information when the UE context is released, the satellite orbit height, and the current time.

In an exemplary implementation, the above third mapping sub-module 1311 determines the current paging cell according to the information of the recommended paging geographic location when the UE context is released; wherein the current paging cell is a cell corresponding to a satellite covering the recommended paging geographical location.

In an exemplary implementation, as shown in FIG. 14, the above network device may further include a timer module 1430 configured to start a timer; and when a service request message sent by a UE is received, stop running the timer.

In an exemplary implementation, the above timer module 1430 is further configured to restart to re-send a paging message to the access network device when the timer expires.

In an exemplary implementation, the above core network device includes an AMF.

It should be understood that the above and other operations and/or functions of modules in the network device according to the embodiment of the present application are respectively for implementing corresponding flows of the network device in the method 900 in FIG. 9 and the method 1000 in FIG. 10, which will not be repeated here for brevity.

Figure 15:
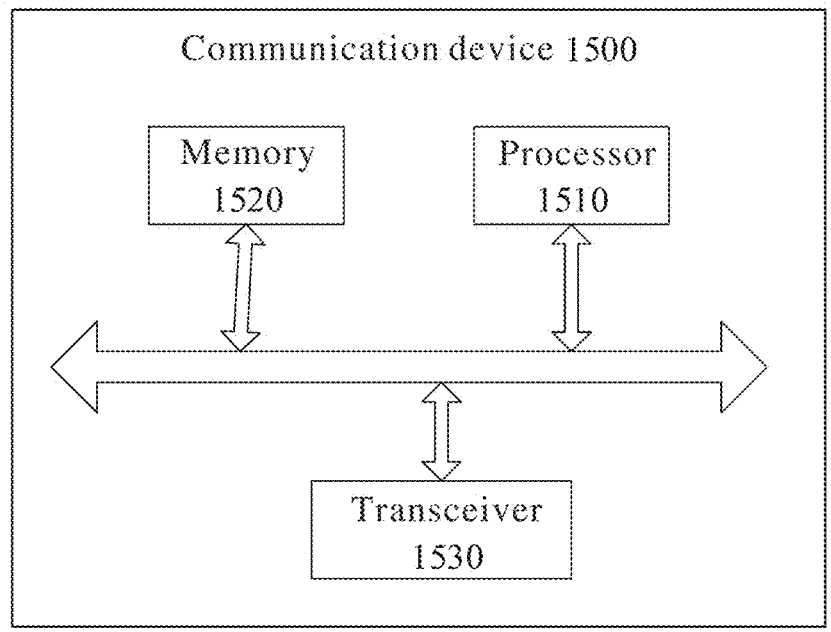
FIG. 15 is a schematic diagram of a structure of a communication device 1500 according to an embodiment of the present application.

FIG. 15 is a schematic diagram of a structure of a communication device 1500 according to an embodiment of the present application. The communication device 1500 shown in FIG. 15 includes a processor 1510, wherein the processor 1510 may invoke and run a computer program from a memory to implement the method in the embodiment of the present application.

In an exemplary implementation, as shown in FIG. 15, the communication device 1500 may further include a memory 1520. The processor 1510 may invoke and run a computer program from the memory 1520 to implement the method in the embodiment of the present application.

The memory 1520 may be a separate device independent of the processor 1510, or may be integrated in the processor 1510.

In an exemplary implementation, as shown in FIG. 15, the communication device 1500 may further include a transceiver 1530, and the processor 1510 may control the transceiver 1530 to communicate with other devices. Specifically, the transceiver 1530 may send information or data to other devices or receive information or data sent by other devices.

The transceiver 1530 may include a transmitter and a receiver. The transceiver 1530 may further include antennas, a quantity of which may be one or more.

In an exemplary implementation, the communication device 1500 may specifically be the network device of the embodiments of the present application, and the communication device 1500 may implement a corresponding flow implemented by the network device in any one of various methods of the embodiments of the present application, which will not be repeated here for brevity.

Figure 16:
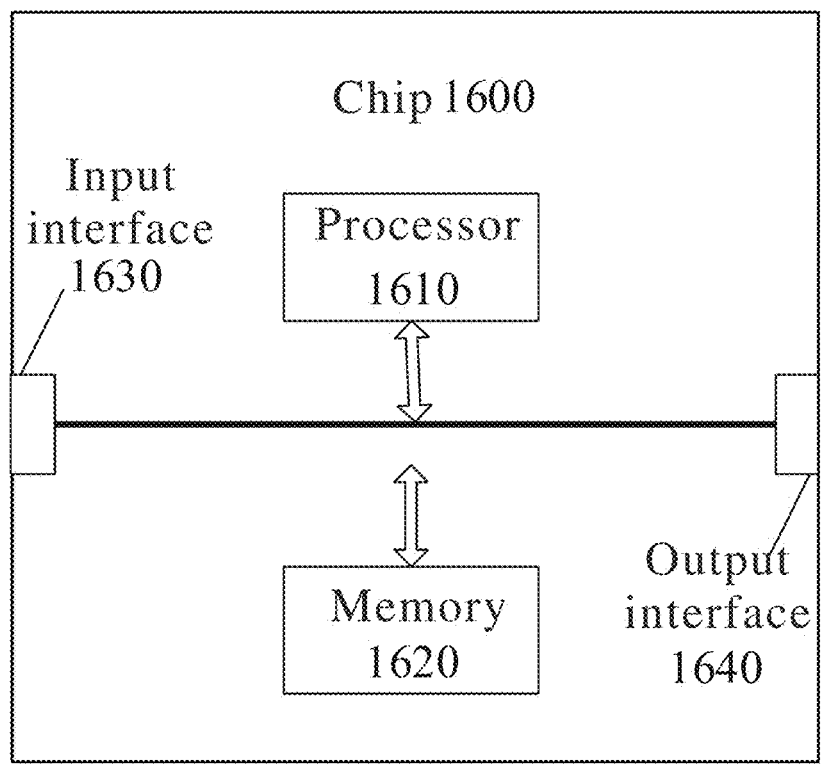
FIG. 16 is a schematic diagram of a structure of a chip 1600 according to an embodiment of the present application.

FIG. 16 is a schematic diagram of a structure of a chip 1600 according to an embodiment of the present application. The chip 1600 shown in FIG. 16 includes a processor 1610, wherein the processor 1610 may invoke and run a computer program from a memory to implement a method in an embodiment of the present application.

In an exemplary implementation, as shown in FIG. 16, the chip 1600 may further include a memory 1620. The processor 1610 may invoke and run a computer program from the memory 1620 to implement the method in the embodiment of the present application.

The memory 1620 may be a separate device independent of the processor 1610, or may be integrated in the processor 1610.

In an exemplary implementation, the chip 1600 may further include an input interface 1630. The processor 1610 may control the input interface 1630 to communicate with another device or chip. Specifically, the processor 1610 may acquire information or data sent by another device or chip.

In an exemplary implementation, the chip 1600 may further include an output interface 1640. The processor 1610 may control the output interface 1640 to communicate with another device or chip. Specifically, the processor 1610 may output information or data to another device or chip.

In an exemplary implementation, the chip may be applied to the network device in the embodiments of the present application, and the chip may implement the corresponding flow implemented by the network device in any one of various methods of the embodiments of the present application, which will not be repeated here for brevity.

It should be understood that the chip mentioned in the embodiments of the present application may also be referred to as a system-level chip, a system chip, a chip system, or a system on chip, etc.

The above-mentioned processor may be a general purpose processor, a Digital Signal Processor (DSP), a Field Programmable Gate Array (FPGA), an Application Specific Integrated Circuit (ASIC) or another programmable logic device, a transistor logic device, or a discrete hardware component, etc. The above-mentioned general-purpose processor may be a microprocessor or any conventional processor, etc.

The above-mentioned memory may be a volatile memory or non-volatile memory, or may include both volatile and non-volatile memories. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM).

It should be understood that, the foregoing memories are for illustration and should not be construed as limitations. For example, the memory in the embodiment of the present application may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), and a Direct Rambus RAM (DR RAM), etc. That is to say, the memories in the embodiments of the present application are intended to include, but are not limited to, these and any other suitable types of memories.

The above-mentioned embodiments may be implemented in whole or in part through software, hardware, firmware, or any combination thereof. When implemented through software, they may be implemented in whole or in part in the form of a computer program product. The computer program product includes one or more computer instructions. When the computer program instructions are loaded and executed on a computer, flows or functions described in the embodiments of the present application are generated in whole or in part. The computer may be a general purpose computer, a special purpose computer, a computer network, or another programmable apparatus. The computer instructions may be stored in a computer-readable storage medium, or transmitted from one computer-readable storage medium to another computer-readable storage medium, for example, the computer instructions may be transmitted from a website site, a computer, a server, or a data center to another website site, computer, server, or data center through a wired mode (e.g., a coaxial cable, an optical fiber, and a Digital Subscriber Line (DSL)) or a wireless mode (e.g., infrared radiation, radio, and microwave). The computer-readable storage medium may be any available medium that can be accessed by a computer or a data storage device such as a server, a data center, or the like that integrates one or more available media. The available media may be magnetic media (e.g., floppy disks, hard disks, magnetic tapes), optical media (e.g., Digital Versatile Disks (DVDs)), or semiconductor media (e.g., Solid State Disks (SSDs)), or the like.

It should be understood that in various embodiments of the present application, sequence numbers of the various processes do not imply an order of execution of the various processes, which should be determined by their functions and internal logics, and should not constitute any limitation on implementation processes of the embodiments of the present application.

Those skilled in the art may clearly understand that for convenience and conciseness of description, specific working processes of the systems, apparatuses, and units described above may refer to corresponding processes in the aforementioned method embodiments, and details will not be repeated here.

The above are merely specific embodiments of the present application, but the protection scope of the present application is not limited thereto. Any person skilled in the art may readily conceive variations or substitutions within the technical scope disclosed by the present application, and the variations or substitutions should be included within the protection scope of the present application. Therefore, the protection scope of the present application shall be subject to the protection scope of the claims.

What is claimed is:

1. A paging optimization method, applied to an access network device comprising a base station, comprising:
    determining, by the access network device, that a User Equipment (UE) has no data to send or receive within a period of time;
    determining information of a recommended paging geographic location associated with the UE when a UE context is released;
    determining a User Equipment (UE) context release request, wherein the UE context release request comprises the information of the recommended paging geographic location;
    sending the UE context release request to a core network device comprising an Access and Mobility Management Function (AMF);
    receiving, from the core network device, a paging message comprising information for determining a current paging cell,
    wherein the information for determining the current paging cell comprises the information of the recommended paging geographic location, and the current paging cell corresponds to a current satellite covering the recommended paging geographical location; and
    performing paging according to the paging message, further comprising:
        determining the current paging cell according to the information of the recommended paging geographic location, and
        performing the paging within the current paging cell.

2. A base station, comprising:
    a processor, configured to execute instructions to perform the paging optimization method of claim 1; and
    a transceiver, configured to send the UE context release request and receive the paging message.

3. A non-transitory computer readable medium, storing a computer program which when executed by a computer, causes the computer to perform the paging optimization method of claim 1.

* * * * *